(12) United States Patent
Kumta et al.

(10) Patent No.: US 10,366,802 B2
(45) Date of Patent: Jul. 30, 2019

(54) COMPOSITIONS INCLUDING NANO-PARTICLES AND A NANO-STRUCTURED SUPPORT MATRIX AND METHODS OF PREPARATION AS REVERSIBLE HIGH CAPACITY ANODES IN ENERGY STORAGE SYSTEMS

(75) Inventors: Prashant Nagesh Kumta, Pittsburgh, PA (US); Wei Wang, Pittsburgh, PA (US); Prashanth Jampani, Mountain View, CA (US); Bharat Gattu, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 1115 days.

(21) Appl. No.: 12/794,374

(22) Filed: Jun. 4, 2010

(65) Prior Publication Data

US 2010/0310941 A1   Dec. 9, 2010

Related U.S. Application Data

(60) Provisional application No. 61/184,581, filed on Jun. 5, 2009, provisional application No. 61/229,447, filed on Jul. 29, 2009.

(51) Int. Cl.
*H01B 1/04* (2006.01)
*H01M 4/131* (2010.01)
(Continued)

(52) U.S. Cl.
CPC .............. *H01B 1/04* (2013.01); *H01M 4/131* (2013.01); *H01M 4/134* (2013.01); *H01M 10/0525* (2013.01); *Y02T 10/7011* (2013.01)

(58) Field of Classification Search
CPC ...... H01M 4/386; H01M 4/625; H01M 4/134; H01M 4/1395; H01M 4/0428; H01M 4/587; H01M 4/362; H01M 4/38
(Continued)

(56) References Cited

U.S. PATENT DOCUMENTS

| 7,189,476 B1 * | 3/2007 | Macklin et al. ........... 429/231.8 |
| 2006/0093885 A1 * | 5/2006 | Krusic et al. .................... 429/33 |

(Continued)

FOREIGN PATENT DOCUMENTS

WO   WO 2007071778 A1 *   6/2007   ............. C01B 31/02

OTHER PUBLICATIONS

Wang, W. et al., "Nanostructured Hybrid Silicon/Carbon Nanotube Heterostructures: Reversible High-Capacity Lithium-Ion Anodes"; ACSNANO; Apr. 5, 2010; pp. 2233-2241; vol. 4—No. 4.
(Continued)

*Primary Examiner* — Jimmy Vo
(74) *Attorney, Agent, or Firm* — Eckert Seamans Cherin & Mellott, LLC; Carol A. Marmo

(57) ABSTRACT

The present invention relates to compositions including nano-particles and a nano-structured support matrix, methods of their preparation and applications thereof. The compositions of the present invention are particularly suitable for use as anode material for lithium-ion rechargeable batteries. The nano-structured support matrix can include nanotubes, nanowires, nanorods, and mixtures thereof. The composition can further include a substrate on which the nano-structured support matrix is formed. The substrate can include a current collector material.

11 Claims, 11 Drawing Sheets

Schematic diagram showing the fabrication of silicon/carbon nanotubes hybrid nanostructures using a liquid injection CVD to grow CNTs first and the subsequent silicon deposition.

(51) Int. Cl.
*H01M 4/134* (2010.01)
*H01M 10/0525* (2010.01)

(58) Field of Classification Search
USPC .............. 429/231.9, 231.95, 231.8; 252/500,
252/520.22, 521.3, 521.5, 520.4, 412,
252/514, 518, 520.5; 977/742, 762
See application file for complete search history.

(56) References Cited

U.S. PATENT DOCUMENTS

2007/0212538 A1* 9/2007 Niu ............................... 428/367
2008/0280207 A1* 11/2008 Patoux et al. .............. 429/231.8
2009/0075157 A1* 3/2009 Pak ........................ B82Y 30/00
429/530

OTHER PUBLICATIONS

Epur, R. et al., Nanoscale Engineered Electrochemically Active Silicon—CNT Heterostructures—Novel Anodes for Li-Ion Application; Electrochimica Acta; Aug. 2012; pp. 680-684.

\* cited by examiner

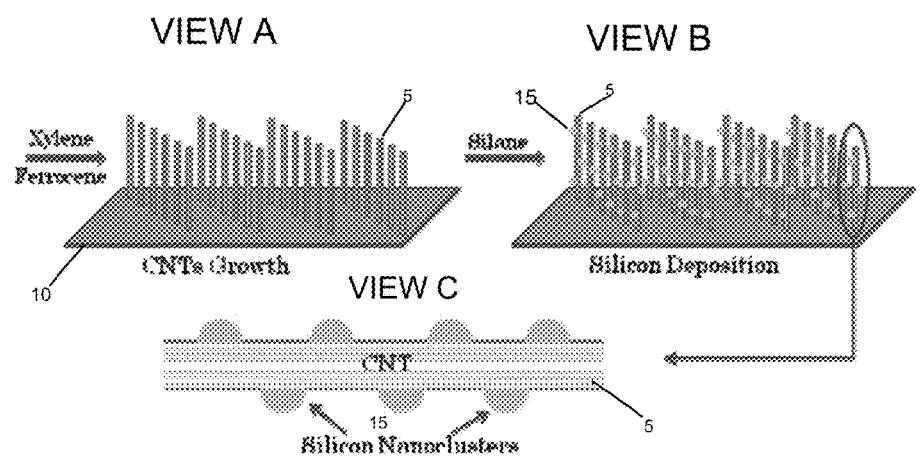
Figure 1. Schematic diagram showing the fabrication of silicon/carbon nanotubes hybrid nanostructures using a liquid injection CVD to grow CNTs first and the subsequent silicon deposition.

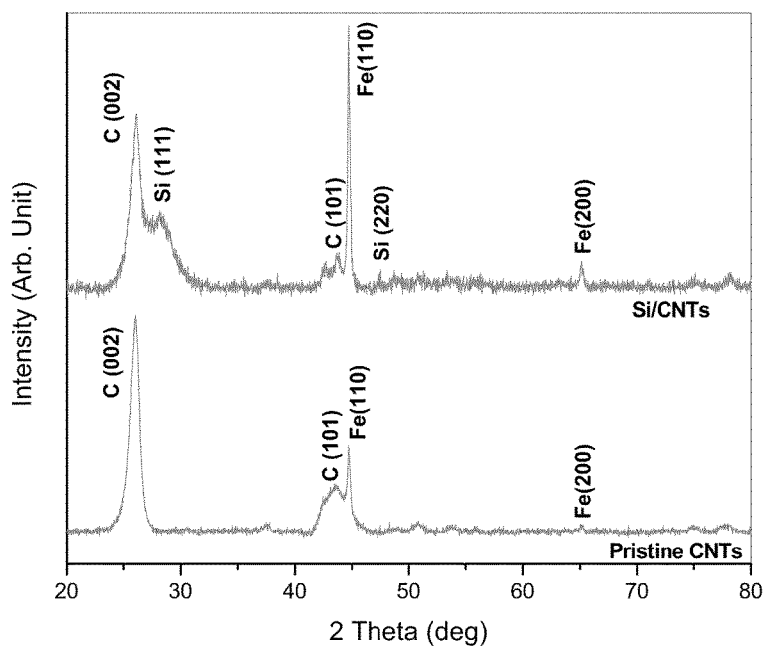
Figure 3. X-ray diffraction patterns of pristine CNTs and hybrid silicon/CNTs nanostructures.

COMPOSITIONS INCLUDING NANO-PARTICLES AND A NANO-STRUCTURED SUPPORT MATRIX AND METHODS OF PREPARATION AS REVERSIBLE HIGH CAPACITY ANODES IN ENERGY STORAGE SYSTEMS

CROSS-REFERENCE TO RELATED APPLICATIONS

This patent application claims priority from U.S. Provisional Patent Application No. 61/184,581 filed on Jun. 5, 2009, and U.S. Provisional Patent Application No. 61/229,447 filed on Jul. 29, 2009.

GOVERNMENT CONTRACT

This work was supported in part by a grant from the United States Department of Energy Batteries for Advanced Transportation Technology (BATT) Program; Grant Number 6826681.

FIELD OF THE INVENTION

The present invention relates to compositions including nano-particles and a nano-structured support matrix, methods of their preparation and applications thereof. The compositions of the present invention are particularly suitable for use as anode material in energy storage systems, such as, lithium-ion rechargeable batteries.

BACKGROUND OF THE INVENTION

Energy storage systems, such as, lithium-ion batteries, are widely used as portable power sources for consumer electronic devices because of their high energy density and flexible design. While graphite is widely used commercially as an anode, i.e., negative electrode, materials in lithium-ion batteries, there is an interest in the art to identify intermetallic materials as potential alternative anode materials with higher capacity, cycle life, and lower irreversibility. Binary and multi-component lithium alloy systems have been considered, which can include tin, silicon, aluminum, antimony (i.e., Sn, Si, Al and Sb, respectively) and mixtures thereof. However, there are concerns associated with these zintl phase systems. In general, with the use of tin, silicon, aluminum, antimony and mixtures thereof, a large volume change can occur during charge/discharge which may result in cracking and crumbling of the anode. This can lead to loss of electrical contact between the active element particles which may cause mechanical failure of the electrode. As a result, the cyclability of the electrode can be severely limited.

For example, silicon may be considered a potential lithium-ion battery anode material to replace the current graphite anode due to its high capacity and abundance in resource. However, application of a silicon anode may be hindered by the rapid capacity decay with cycling. There can be large volume changes associated with various phase transitions occurring during the lithium alloying and de-alloying processes. Thus, there is a resulting potential for decrepitation and breakdown of an electronic contact network in the electrode.

Various techniques have been identified for preparing suitable one-dimensional (1D) nano-structure anode materials, including decomposition of organic precursors, high energy mechanical milling (HEMM), chemical vapor deposition, sputtering, physical mixing, and carbon coating on silicon particles.

The methods used to produce silicon thin film anode materials having good cycling performance include vapor phase deposition methods such as pulsed laser deposition (PLD), sputtering, and molecular beam epitaxy which may not be commercially feasible due to the high cost and low yield of these processes.

The process of slurry mixing and casting of 1D nano-structure anode materials to fabricate electrode films can diminish the advantages provided by the 1D nano-structure anode materials. For example, the addition of polymer binder and carbon black may reduce the diffusion distances, and may also create unwanted additional interfaces thereby increasing the ionic impedance and electronic resistance. The slow kinetics within the polymer binder interface between the active materials and substrate may be an obstacle to attaining the intrinsic characteristics of the anode material while limiting the rate capability of the battery.

There is a need to develop rechargeable lithium-ion batteries with higher energy density and longer service life to power for use in diverse applications including electronic devices, electric vehicles, intermittent power source storage, and implantable energy systems and the like. Further, there is a need to develop an anode material including a nano-scale composition for use in energy storage applications. Furthermore, there is a need to employ 1D nano-structures in the preparation process of electrodes to preserve the configuration and morphology, and therefore the benefits, of the nano-scale anode material. Moreover, there is a need to generate an anode exhibiting a stable reversible capacity, e.g., of above 1000 mAh/g, with a silicon and carbon composite material.

SUMMARY OF THE INVENTION

In one aspect, the present invention provides an anode nano-scale composition. The composition includes a nano-structured support matrix; and nano-particles selected from the group consisting of metallic, metalloid, and non-metallic nano-particles, and mixtures thereof, wherein an interfacial bonding is formed between the nano-structured support matrix and the nano-particles.

The nano-structured support matrix can be selected from the group consisting of nanotubes, nanowires, nanorods, and mixtures thereof.

The anode nano-scale composition can further include a substrate, wherein the nano-structured support matrix is formed on the substrate. The substrate can include a current collector material.

In another aspect, the present invention provides a method of preparing an anode nano-particle composition. The method includes providing a substrate; growing a nano-structured support matrix on the substrate; and depositing nano-particles on the surface of the nanostructured support matrix. The nano-particles are selected from the group consisting of metallic, metalloid and non-metallic nano-particles, and mixtures thereof.

The substrate can include a current collector material.

The nano-structured support matrix can be selected from the group consisting of nanotubes, nanowires, nanorods, and mixtures thereof.

The nano-structured support matrix can be vertically aligned with each other and perpendicular to the substrate. An interfacial bond can be formed between the nano-structured support matrix and the nano-particles.

The method can further include applying a coating to a structure formed by the deposition step, the coating including a material selected from the group consisting of carbon, metal, oxide, nitride, sulfide, and mixtures thereof.

In further aspects, the present invention provides for an electrode and a rechargeable lithium-ion battery including the anode nano-scale compositions as described above.

DETAILED DESCRIPTION OF THE DRAWINGS

The invention is further illustrated by the following drawings, in which:

FIG. 1 is a schematic diagram showing the fabrication of a silicon/carbon nanotube hybrid nanostructure using a simple two step liquid injection chemical vapor deposition (CVD) process to grow carbon nanotubes (CNTs) and to subsequently deposit silicon particles/nanoclusters/films thereon.

FIG. 3 is a plot showing X-ray diffraction patterns of pristine CNT and hybrid silicon/CNT nanostructures.

Figures 7A, 7B, 7C, 7D:
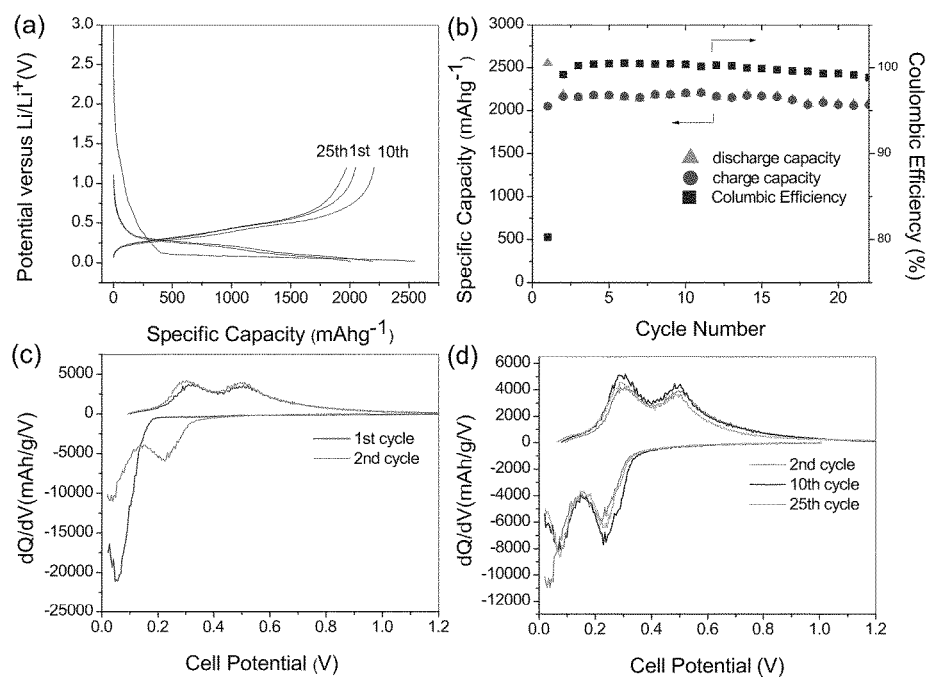
FIG. 7(a) is a plot showing a voltage profiles for hybrid silicon/CNTs nanostructures anode after 1, 10 and 25 cycles.
FIG. 7(b) is a plot showing discharge/charge capacity and Coulombic efficiency of the cell over 25 cycles.

FIGS. 7(c) and 7(d) are plots showing differential capacity with cell potential of hybrid silicon/CNTs nanostructures anode. FIG. 7(c) after 1st and 2nd cycle, and FIG. 7(d) after 2nd, 10th, and 25th cycle.

Figure 8:
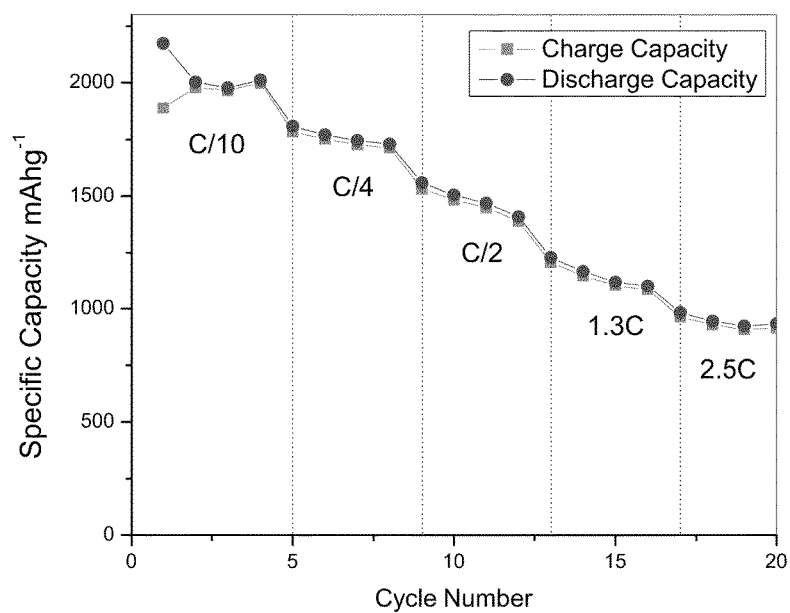

FIG. 8 is a plot showing specific capacity of hybrid silicon/CNTs nanostructures anode cycling at different discharge and charge rates.

Figure 9:
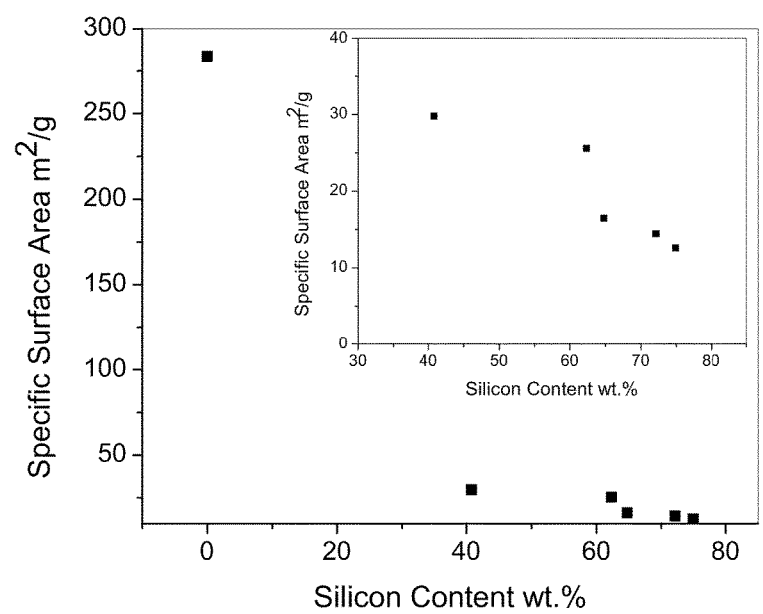

FIG. 9 is a plot showing specific surface area plotted against silicon content. The insert is a magnified view of the region where the silicon content ranges from about 40 to about 75 wt. %.

DETAILED DESCRIPTION OF THE INVENTION

The present invention relates to a nano-scale composition including nano-particles and a nano-structured support matrix. The composition can further include a substrate. The nano-structured support matrix can be formed on the substrate. The nano-scale composition can be used as an anode material in various energy storage systems. In one aspect of the invention, the composition can be employed as an anode material for use in a rechargeable lithium-ion battery.

Without intending to be bound by any particular theory, it is believed that in the present invention, which includes a hybrid composition including nano-particles and a nano-structured support matrix (such as for example, but not limited to, silicon nano-particles and carbon nanotubes, respectively), the nano-structured support matrix serves as a core to provide mechanical strength and conductivity. Further, the nano-structured support matrix provides the mechanical support to accommodate the significant volume change during cycling, and provide a facile pathway for electrons and lithium ions transportation. For example, carbon nanotubes have demonstrated superior mechanical strength and kinetic transport capability for electrons and lithium ions. The nano-particles serve as the shell, to form nanoclusters or a thin layer, such as but not limited to a film, and to provide reaction sites with lithium to deliver high capacity. Further, it is believed that the combination of the nano-structured support matrix and the nano-particles is capable to address the challenge of decrepitation during cycling while supplying a high reversible capacity.

Suitable materials for use as the nanostructured support matrix include nanotubes, nanowires, nanorods, and mixtures thereof. Suitable nanotubes can include single-walled nanotubes, multi-walled nanotubes, and mixtures thereof. In one embodiment, the nanotubes are carbon nanotubes. In other embodiments, the nanotubes can include any material that is relatively inert to lithium, such as, but not limited to, boron (B), carbon nitride ($C_3N_4$), boron nitride (BN), titanium nitride (TiN), titanium carbide (TiC), silicon carbide (SiC), silicon nitride ($Si_3N_4$), tungsten nitride (WN), molybdenum nitride (MoN), molybdenum di-nitride ($Mo_2N$), vanadium nitride (VN), chromium nitride (CrN), boron carbide ($B_4C$), titanium di-boride ($TiB_2$), tungsten carbide (WC), molybdenum carbide (MoC), vanadium carbide (VC), $BC_3$, dimolybdenum boride ($Mo_2B$), transition metal silicides, non-oxide nanotubes and nanotubes of transition metals, and mixtures thereof. In one embodiment, the transition metal silicides can include materials of the general formula $M_xSi_y$, wherein M represents Ti, V, Cr, Fe, Ni, Co, Cu, and mixtures thereof, and $x$ and $y$ represent integers.

Further, a suitable nano-structured support matrix can include nanowires and nanorods. Suitable nanowires, and nanorods for use in the present invention can include but are not limited to oxide nanowires and nanorods of transition metals and Group IV, Group IIIA, Group IIIB, and Group II, including zinc oxide (ZnO), tin dioxide ($SnO_2$), indium oxide ($In_2O_3$), cadmium oxide (CdO), silicon dioxide ($SiO_2$) and copper oxide (CuO), metal and semiconducting nanowires and nanorods including copper (Cu), titanium (Ti), chromium (Cr), iron (Fe), nickel (Ni), manganese (Mn), cobalt (Co), zinc (Zn), gallium nitride (GaN), boron nitride (BN), silicon nitride ($Si_3N_4$), titanium nitride (TiN), titanium carbide (TiC), titanium di-boride ($TiB_2$), gallium arsenide (GaAs), gallium phosphide (GaP), indium phosphide (InP), aluminum phosphide (AlP), transition metal silicides, and mixtures thereof. In one embodiment, the transition metal silicides can include materials of the general formula $M_xSi_y$, wherein M represents Ti, V, Cr, Fe, Ni, Co, Cu, and mixtures thereof, and $x$ and $y$ represent integers.

The nano-structured support matrix is formed on a surface of a substrate using a deposition method. The growth rate can vary and may depend on at least one of the composition of the substrate, the composition of the nano-structured support matrix and the deposition method and conditions employed. In an embodiment, the nano-structured support matrix includes multi-walled nanotubes (MWNTs) and the average growth rate on a quartz substrate is about 25 um/h. Further, the number, size and diameter of the nanotubes, nanowires and nanorods can vary. For example, a plurality of nanotubes, nanowires and nanorods can be used having different sizes and diameters. In one embodiment, a nano-structured support matrix includes MWNTs and the dominant tube diameter is from about 20 to about 50 nm. In alternate embodiments, the diameter is from about 20 to about 25 nm or from about 40 to about 50 nm.

Various deposition techniques known in the art can be used. In one embodiment, the deposition process is a chemical vapor deposition (CVD) process. In alternative embodiments, other vapor deposition techniques, such as pulsed laser deposition (PLD), radio frequency (RF) and direct current (DC) multi-target sputtering, liquid phase epitaxy, plasma enhanced CVD, and molecular beam epitaxy can be used. The deposition time can vary and can depend on the application of the subsequent anode material formed. In an embodiment, the deposition time can be up to and including twenty minutes. In other embodiments, the deposition time can be greater than twenty minutes.

In a further embodiment, the nano-structured support matrix is deposited such that it is vertically aligned on the substrate. For example, in an embodiment, the nano-structured support matrix can include nanotubes, nanowires, nanorods and mixtures thereof, and the nano-structured support matrix can be deposited such that the nanotubes, nanowires, nanorods and mixtures thereof, are vertically aligned with one another and perpendicular to a surface (e.g., planar surface) of the substrate. The vertically-aligned nanotubes, nanowires, nanorods, and mixtures thereof can have defined spacing therebetween.

Various materials known in the art can be used as the substrate onto which the nano-structured support matrix may be formed. In one embodiment, the substrate can include a current collector material. Without intending to be bound by any particular theory, a current collector (or charge collector) is a structure within an electrode (such as a battery electrode) that provides a path for an electric current to or from the active material. Suitable substrates for use in the present invention can include, but are not limited to, for example, quartz, nickel, copper, stainless steel, tantalum, titanium, Inconel, and mixtures thereof. In one embodiment, the substrate includes an Inconel alloy, such as, for example, Inconel 600.

A successive deposition process is used to deposit the nano-particles onto the surface of the nano-structured support matrix. The deposition process can be selected from a variety of known processes and can include those deposition processes described herein. The deposition process used to form the nano-particles can be the same deposition process as used to form the nano-structured support matrix, or a different deposition process. In one embodiment, the deposition process is a chemical vapor deposition (CVD) process.

The nano-structured support matrix surface provides a site for nano-particles to nucleate and grow. The nano-particles and/or nanoclusters formed can vary in size. In one embodiment, the nano-particles include silicon and the average particle size is about 40 nm in diameter.

The nano-particles can include elements, such as metallic, metalloid, non-metallic, and mixtures thereof. Non-limiting examples of suitable elements can include aluminum (Al), silicon (Si), tin (Sn), antimony (Sb), germanium (Ge), lead (Pb), bismuth (Bi), magnesium (Mg), zinc (Zn), cadmium (Cd), indium (In), calcium (Ca), arsenic (As), platinum (Pt), silver (Ag), gold (Au), mercury (Hg), chromium (Cr), gallium (Ga) and mixtures thereof. Lithium (Li) is known to form intermetallic, 'Zintl' phases with these elements. Alloys can be formed at ambient (i.e., room) temperature when these elements are polarized to a sufficiently negative potential in a lithium-ion conducting electrolyte. For example, the alloy $Li_xM$ formation is reversible and therefore, M can represent the aforementioned elements.

The use of elements other than silicon (Si), or in combination with Si, provides the ability to generate alloy phases in various forms, such as, in the form of nano-particles, droplets, nano-clusters or thin films. These various alloy phases or compositions can enable the generation of phases that contain a larger amount of lithium per mole than that afforded by Si, i.e. $Li_{4.4}Si$. Without intending to be bound by any particular theory, it is believed that the ability to generate droplets, clusters, and thin film coatings on the nano-structured support matrix can enable enhanced kinetics of alloying and de-alloying. Therefore, affording highly reversible capacities, such as, for example, up to and including 1000 mAh/g or up to and including 4000 mAh/g. Further, the formation of these different nanoscale architectures of films, droplets and reinforced composites including metastable and equilibrium compositions and phases with dense and porous morphologies, results in the ability to exhibit highly reversible and stable capacities. Thus, the ability to selectively synthesize different forms of composites can enable the present invention to meet the various requirements of batteries having different dimensions and configurations, such as, thin film cells, cylindrical cells, and prismatic cells.

In one embodiment, at least one of the nano-particles and the nano-structured support matrix can be doped. The dopant can be selected from a variety of known materials and can include, but is not limited to, sulfur (S), phosphorus (P), nitrogen (N), boron (B), selenium (Se) and mixtures thereof. The presence of a dopant can provide n- and p-type conductivity for improved conductivity for both electrons and lithium ions (e.g., in a rechargeable lithium ion battery). The doping may be conducted using a variety of conventional techniques. In one embodiment, the doping is conducted by introducing a dopant-containing gas. In another embodiment, the doping is conducted by injecting a solvent with the dopant dissolved therein.

In one embodiment, the nano-particles (such as, but not limited to, silicon nano-particles) are deposited onto the surface of the nano-structured support matrix (such as, but not limited to, multi-walled carbon nanotubes) by a flow of a gas (such as, but not limited to, silane gas ($SiH_4$)) through a deposition process (such as, but not limited to, a low pressure CVD process). At least one of the flow rate of the gas, reaction duration and temperature can be controlled to obtain different forms of the hybrid nano-particle/nano-structured support matrix composition including a layer coating, a nano-cluster coating and a silicon thin film.

In one embodiment, higher temperatures, such as for example, in the range of from about 550° C. to about 700° C., can promote the formation of a silicon thin film encapsulating pre-grown CNTs. In another embodiment, the use of lower temperatures, such as, for example, in the range of from about 400° C. to about 550° C., can promote the formation of a layer coating or nanocluster coating of silicon which can be selectively grown onto the CNTs by varying the flow rate of carrier gas and reaction time. For example, a high flow rate, such as greater than about 500 sccm, and a relatively short reaction time, such as in the range of from about 10 to about 20 minutes can result in a nanocluster coating. The layer-type coatings are typically obtained by employing a relatively low flow rate, such as, for example, greater than about 200 sccm and a relatively long reaction time, such as, for example, greater than about 20 minutes.

The microstructure and phases, as well as the presence of the aforementioned elements (e.g., metallic, metalloid, and non-metallic) such as, for example, silicon, also can be controlled to form crystalline, nanocrystalline or amorphous material, such as, for example, amorphous silicon, by varying the deposition temperature.

Thus, the hybrid composition (nano-particles/nano-structured support matrix) of the present invention can provide the ability to select or control at least one of the composition, microstructure and phases to meet desired electrochemical requirements.

In one embodiment, a two-step chemical vapor deposition (CVD) process in accordance with a template-free approach can be employed to prepare the composition of the present invention. In one embodiment, a liquid-injection based CVD system can be used. In this embodiment, the process includes synthesizing vertically aligned carbon nanotubes, such as, MWNTs on a substrate, such as a bare quartz microscope slide or a current collector, such as, an Inconel alloy, through a liquid injection based CVD reactor, in which a hydrocarbon source, such as, xylene is present as well as catalyst, such as, for example, iron from decomposition of ferrocene. Subsequently, silicon is deposited onto the MWNTs by a flow of silane gas ($SiH_4$) through a low pressure CVD process. The deposition of the silicon particles can be such that there is a defined spacing in-between the silicon nano-particles to preclude agglomeration. The hybrid silicon/carbon nanotubes are then scraped-off from the substrate for use as lithium-ion battery anode material. Without intending to be bound by any particular theory, it is believed that the silicon to carbon (Si/C) ratio can be controlled by the duration of reactions for MWNTs growth and silicon deposition, which enables control of the electrochemical properties of the hybrid silicon/carbon nanotubes. The Si/C ratio can vary. In one embodiment, the Si/C ratio can be from 4:1 to 0.5:1.

The nano-particle/nano-structured support matrix composition of the present invention can provide significant improved cycling performance at a high capacity.

FIG. 1 shows an embodiment of the present invention for preparing a nanoscale composition. As shown in View A of FIG. 1, a plurality of carbon nanotubes 5 are synthesized or grown on a substrate 10. Xylene is present as well as iron catalyst from the decomposition of ferrocene. The pristine carbon nanotubes 5 prior to silicon deposition are positioned on the substrate 10 such that they are vertically aligned and perpendicular to the substrate 10. Further, as shown in View B of FIG. 1, the flow of silane gas (for example, through a low pressure CVD process, not shown) results in the deposition of silicon particles or nanoclusters 15 on the carbon nanotubes 5. The overall configuration, i.e., the vertical alignment of the carbon nanotubes 5, is maintained following silicon deposition. View C of FIG. 1, shows an exploded view of the silicon particles or nanoclusters 15 deposited on one of the carbon nanotubes 5 such that there is spacing provided between the silicon particles or nanoclusters 15. Without intending to be bound by any particular theory, it is believed that the spacing may be a factor in preventing the agglomeration of silicon particles or nanoclusters. Agglomeration may lead to particle growth resulting in the inability to curtail the mechanic stress induced during cycling without pulverization.

Figures 2A, 2B, 2C, 2D:
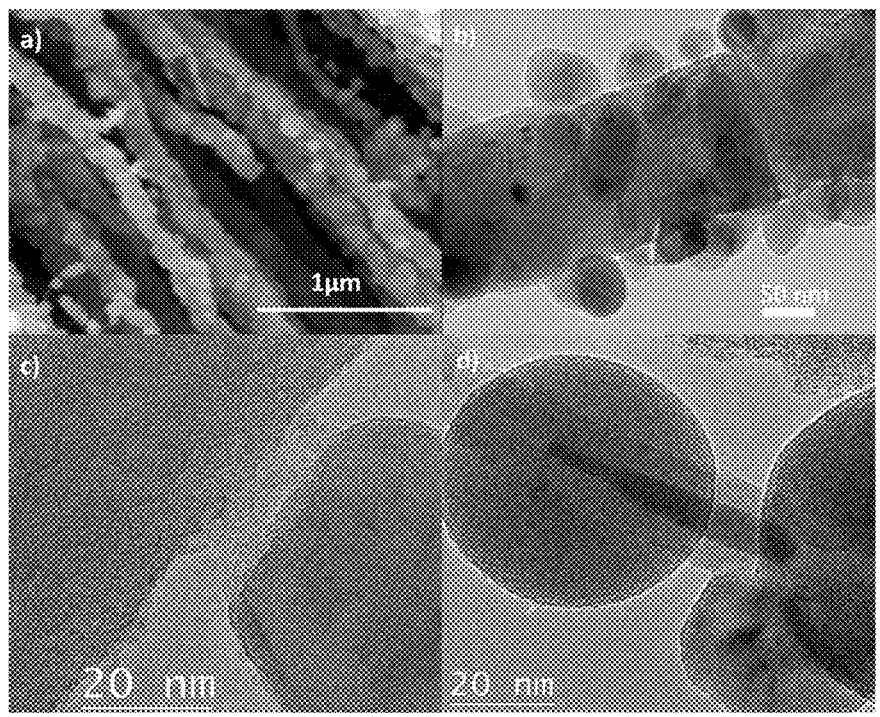
FIG. 2(a) is a low-magnification scanning electron microscopy (SEM) image showing multiple carbon nanotubes covered with silicon nanoclusters.
FIG. 2(b) is a transmission electron microscopy (TEM) image showing a single carbon nanotube covered with multiple silicon nanoclusters with defined spacing in-between the silicon nanoclusters.
FIG. 2(c) is a high-resolution TEM (HR-TEM) image showing a silicon particle grafted on a carbon nanotube.
FIG. 2(d) is a HR-TEM image showing a carbon nanotube with two silicon nano-particles.

In accordance with an embodiment of the present invention, FIG. 2(a) is a low-magnification scanning electron microscopy (SEM) image showing multiple carbon nanotubes having deposited thereon silicon nanoclusters. FIG. 2(b) is a transmission electron microscopy (TEM) image showing a single carbon nanotube having deposited thereon multiple silicon nanoclusters. The silicon nanoclusters are deposited such that there is spacing therein between. FIG. 2(c) is a high resolution-transmission electron microscopy (HR-TEM) image showing a silicon particle that is deposited on a carbon nanotube such that an interfacial bonding is created between the silicon particle and the carbon nanotube. Without intending to be bound by any particular theory, it is believed that deposition of nano-particles or nanoclusters on a nano-structured support matrix can result in an interfacial bonding there-between which may contribute to the excellent mechanical strength and facile transportation properties of the nano-structured support matrix to improve the cycling performance of lithium ion battery anode. For example, this adhesion between carbon nanotube and silicon particle allows the active silicon particle to be in contact with the carbon nanotube during lithium alloying and de-alloying.

FIG. 2(d) is a HR-TEM image of a carbon nanotube with two silicon nanoparticles deposited thereon.

Further, it is contemplated that the nano-particle/nano-structured support matrix of the present invention can further undergo high temperature treatment, and application of a coating on the surface of this hetero-structure with different materials such as carbon, metal, oxides and nitrides.

Figure 2E:
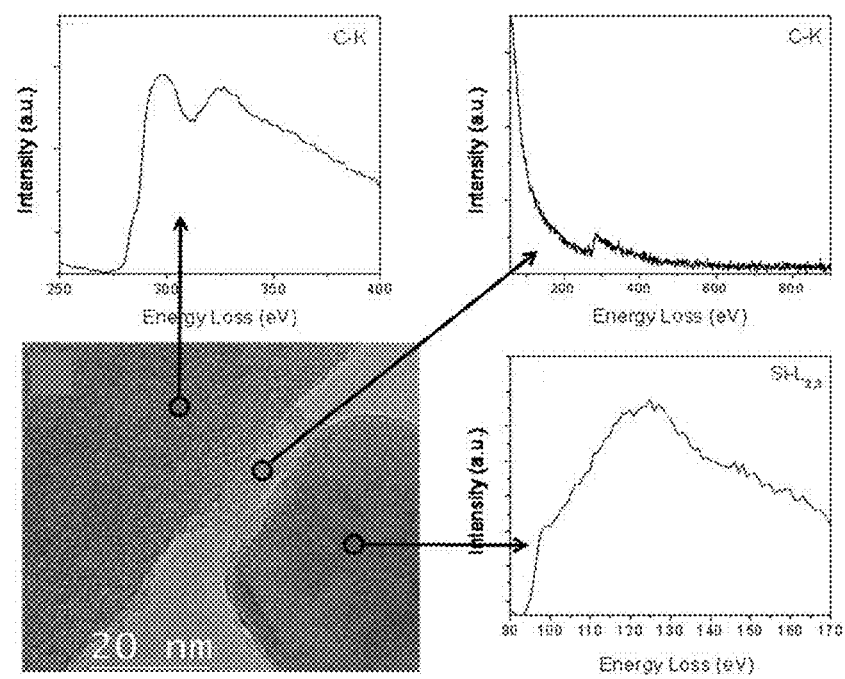
FIG. 2(e) is an Electron Energy Loss (EELS) spectroscopy plot showing the amorphous carbon layer tethering the Si nanocluster onto the underlying CNT.

FIG. 2(e) is an HR-TEM and an EELS spectra showing the presence of a thin amorphous carbon interlayer between the Si nano-particle and the underlying CNT. This amorphous carbon layer serves to tether the Si to the CNT. FIG. 2(e) includes a high-resolution TEM (HR-TEM) image showing a crystalline silicon nanocluster about 40 nm in diameter size adhered to a single carbon nanotube. It is evident from FIG. 2(e) that a distinct interfacial layer is formed between the carbon nanotube and silicon particle. The composition of the interfacial layer has been studied by conducting electron energy-loss spectroscopy (EELS) measurements on carbon nanotube, silicon particle, and the interface. EELS spectra collected at the carbon nanotube shown in FIG. 2(e) demonstrate two peaks, one at 298 eV and the other at 325 eV, both of which are attributed to the energy loss peaks of π-bonds and σ-bonds of carbon. At the center of the silicon particle, the EELS spectra collected matches well with that of $L_{2,3}$ edge for pure silicon, which start at about 100 eV followed by a broadened region. It is also evident from FIG. 2(e) that the EELS spectra acquired from the interfacial region between the silicon particle and carbon nanotube corresponds to that of amorphous carbon. Apart from this amorphous carbon peak, there are no other peaks detected from the spot on the interface. Furthermore, there is no peak at 103 eV characteristic of SiC eliminating its existence at the interface. The anchoring of the Si nanoclusters to the underlying CNTs by an amorphous carbon interface layer contributes to maintaining the Si clusters in contact with the CNTs during electrochemical cycling.

Without intending to be bound by any particular theory, the formation of the amorphous carbon interfacial layer is believed to be initiated at the beginning of the silicon deposition, in which the $SiH_4$ gas adsorbs onto the carbon nanotubes surface prior to its decomposition. Due to the high affinity between hydrogen and carbon atoms, it is likely that an initial condition favorable to the creation of a hydrogen-carbon surface between the carbon atoms on the carbon nanotube and the hydrogen atoms corresponding to the $SiH_4$ gas is created. The attachment of the $SiH_4$ gas droplet on to the CNT can act as a bridge to connect the carbon and silicon atoms during the subsequent decomposition process eventually resulting in the formation of the solid silicon particle. Due to the strong affinity of silicon and carbon to hydrogen, it is likely that intermediate complex moieties of —[Si—H . . . C]$_n$ type species are formed. Since the growth temperature is below the thermodynamic temperature favorable for the formation of SiC, it is likely that the carbon separates out from the silicon-hydrogen-carbon complex to form the observed amorphous carbon interface layer.

The preparation process used to produce an anode using the nanoparticle/nano-structured support matrix of the present invention, can limit the benefits associated the nanoparticle/nano-structured support matrix, such as, but not limited to fast diffusion and conductivity. In an embodiment, the silicon/carbon nanotube structure is fabricated directly onto a current collector substrate to obtain an integrated nanoscale hierarchical electrode. The addition of binder and carbon black, which are used in a conventional process to prepare the electrode, is not needed in this embodiment of the present invention. Thus, the additional interfaces and weight associated with conventional electrode preparation also can be eliminated. The as-prepared electrode can be directly used for battery assembly without any post-growth treatment. This approach can replace the conventional graphite/binder/carbon black slurry cast methods.

Current collector substrates can include those known in the art and those described herein. In a further embodiment, a metal current collector substrate can include nickel (Ni), copper (Cu), chromium (Cr), iron (Fe), titanium (Ti), silver (Ag), stainless steel (SS), copper nitride (Cu—Ni), Inconel, and mixtures thereof. In one embodiment, the current collector substrate includes an Inconel alloy, such as, Inconel 600.

In the embodiment where the silicon/carbon nanotube structure is fabricated directly onto a current collector substrate, the carbon nanotubes (e.g., nano-structured support matrix) are synthesized onto a metal current collector substrate (e.g., Inconel 600 alloy) to achieve essentially direct pathways for transportation. In accordance with descriptions herein, various forms of coating or thin film can be fabricated with the ability to tune or customize phase structure of silicon and silicon/carbon structure. As previously discussed, the elements (such as, for example, Si) can be in various forms such as nano-particles, droplets, nano-clusters or thin films. Thus, the ability to selectively synthesize different forms can be tuned to the requirements of batteries having different dimensions and configurations.

Further, the current collector substrate/nano-particle/nano-structured support matrix structure can be treated at high temperature and/or coated on the surface with different materials such as carbon, metal, oxides, nitrides and mixtures thereof.

Without intending to be bound by any particular theory, it is contemplated that surface functionalization of the surface of the nano-structured support matrix with oxide or nitride groups may increase the interfacial bonding between the nano-structured support matrix and nano-particles at appropriate conditions to further improve the electrochemical performance.

Moreover, it is contemplated that the nano-particle/nano-structured support matrix of the present invention can be used to generate an anote capable of exhibiting a stable reversible capacity of ≥1000 mAh/g.

EXAMPLES

Example 1

Growth of CNTs on Bare Quartz Microscopy Slide

A two-stage CVD reactor comprising liquid and gas injectors was employed for preparing multi-walled carbon nanotubes (MWNTs) on bare quartz microscopy slides inside a quartz tube. About 6.5 mol % of ferrocene was dissolved in xylene to obtain a feed solution with about 0.75 at. % Fe/C ratio, and was injected continuously into the two-stage tubular quartz reactor, which was maintained at a temperature of about 200° C. for pre-heater and about 750° C. for reactor, respectively. Ferrocene sublimes at about 190° C. and xylene has a boiling temperature of about 140° C. The liquid exiting the capillary tube was immediately volatilized and swept into the reaction chamber by a flow of about 750 sccm mixture of ultra-high purity argon (UHP-Ar) with about 10% pure hydrogen. After the reaction, the pre-heater and the furnace were allowed to cool down in flowing argon.

Deposition of Silicon on Pre-Grown Carbon Nanotubes

Silicon deposition was performed in the same CVD furnace, where the pre-grown CNTs with quartz slide was loaded at the center of a hot zone. The reactor was pumped to vacuum, purged with UHP-Ar gas and then heated to desired temperatures. The deposition was carried out for different periods of time at a temperature between 450° C. and 750° C. with a mixed flow of 20 sccm $SiH_4$ and 680 sccm of argon. The mass of the CNTs and silicon was accurately determined by measuring the mass of the substrate each time before and after the CNTs growth and silicon deposition using an analytical balance (Mettler Toledo AB135, 0.01 mg). The as-synthesized silicon/CNTs were then scraped off from the quartz substrate for characterization and electrochemical testing.

Materials Characterization

The silicon/CNTs nanomaterial powders were characterized by X-ray diffraction (XRD) using a Philips XPERT PRO system with CuKα (λ=0.15406 nm) radiation in order to identify the phases present. Scanning electron microscopy (SEM) (Philips XL30 operating at 20 kV) was employed to investigate the microstructure as-synthesized. Transmission electron microscopy (TEM) and high-resolution TEM (HR-TEM) were performed on a Joel 2000EX to observe the morphology, structure and particle size of the as-prepared nanomaterials. For TEM analysis, the silicon/CNTs nanomaterial powders were dispersed on 3.05 mm diameter copper grids (electron microscopy science) containing a holey carbon film in methanol by sonication followed by drying in a desiccator over night.

Electrochemical Test

The hybrid silicon/CNTs nanomaterials electrodes were fabricated on a copper substrate of approximately 10 mm diameter in order to evaluate the electrochemical characteristics primarily involving constant current cycling tests. About 50 wt. % of the active powder, about 10 wt. % acetylene carbon black and about 40 wt. % of sodium carboxymethyl cellulose (CMC) binder were dissolved in di-water and were mixed to produce a slurry. The slurry was then coated onto a copper foil and dried over night at 383 K in a vacuum oven prior to assembling the customized test cell. A 2016 coin cell design was utilized for the electrochemical tests employing a lithium foil as the counter electrode and 1 M $LiPF_6$ in ethylene carbonate (EC)/dimethyl carbonate (DMC), in a 2:1 ratio, as the electrolyte. All the batteries tested in this study were cycled from 0.02 to 1.2 V employing a constant current density of 160 $mAg^{-1}$ and a one minute rest period between the charge/discharge cycles using a potentiostat (Arbin electrochemical instrument).

A two-step chemical vapor deposition (CVD) was employed to prepare the hybrid silicon/carbon nanotubes through a template free approach. The multi-walled carbon nanotubes (MWNTs) were first synthesized on bare quartz microscope slides through a liquid injection based CVD reactor, in which xylene ($Ca_8H_{10}$) served as hydrocarbon source and iron from decomposition of ferrocene ($Fe(C_5H_5)_2$) catalyzed the growth of MWNTs. The system was subsequently pumped down to deposit silicon onto MWNTs by a flow of $SiH_4$ gas. The hybrid silicon/carbon nanotubes were scraped off from the quartz slides to prepare the electrode for electrochemical evaluation. The Si/C ratio was controlled by the duration of reactions for MWNTs growth and silicon deposition, respectively, which enabled tuning of the electrochemical properties of the hybrid silicon/carbon nanotubes.

X-ray diffraction (XRD) patterns of pristine CNTs and hybrid silicon/CNTs nanostructures are shown in FIG. 3. The presence of the nanocrystalline silicon characteristic peaks corresponding to the (111),(220) diffraction planes are observed. A peak at 26.4° attributed to the (002) plane of hexagonal graphite structure indicates the presence of CNTs. The existence of iron which is used to seed the growth of CNTs from the decomposition of Ferrocene is confirmed by the Fe peak of (110) and (200).

Figures 4A, 4B, 4C, 4D:
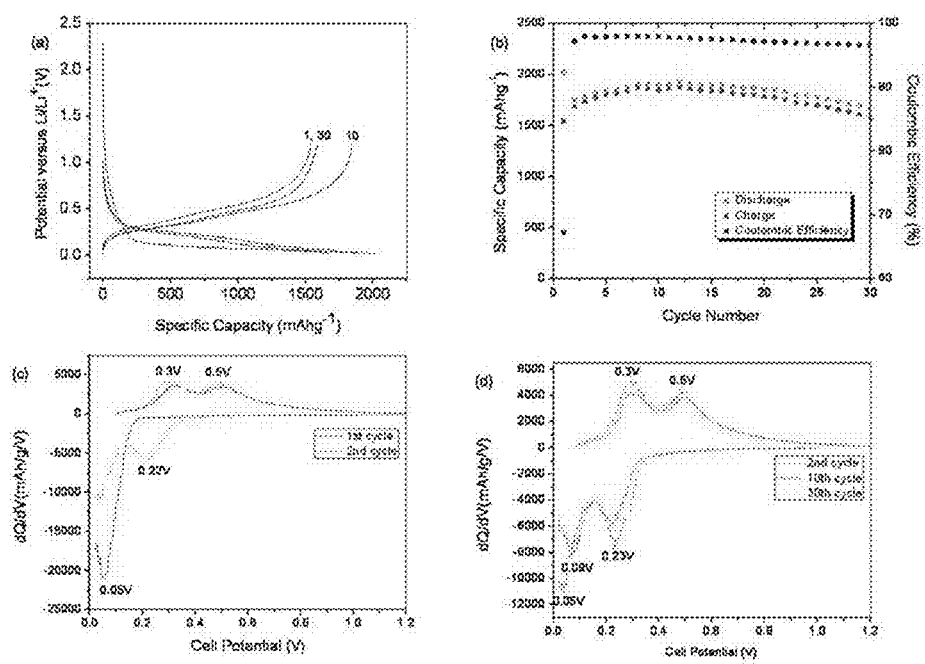
FIG. 4(a) is a plot showing voltage profiles for hybrid silicon/CNT nanostructure on a quartz substrate after 1 cycle, 10 cycles and 30 cycles.
FIG. 4(b) is a plot showing a curve of discharge/charge capacity and Coulombic efficiency of the cell over 30 cycles for a hybrid silicon/CNT nanostructure on a quartz substrate.
FIG. 4(c) is a plot showing differential capacity with cell potential of hybrid silicon/CNT nanostructure anodes after first and second cycles for a hybrid silicon/CNT nanostructure on a quartz substrate.
FIG. 4(d) is a plot showing differential capacity with cell potential of hybrid silicon/CNT nanostructure anodes after 2nd, 10th and 30th cycles for a hybrid silicon/CNTs nanostructure on a quartz substrate.

FIG. 4(a) shows voltage profiles of the hybrid silicon/CNTs nanostructures anode after 1, 10, 30 cycles. From the voltage profile, it is demonstrated that the electrochemical lithiation and de-lithiation of the nanocrystalline silicon particles attached to the CNTs surface produced a long flat plateau during the first discharge. The onset of the silicon lithiation potential plateau of about 160 mV indicated the presence of crystalline silicon. In FIG. 4(a), there is no other potential plateau resolved other than the one that represents the silicon.

The variation of specific gravimetric capacity with cycle number of the hybrid silicon/CNTs nanostructures anode is shown in FIG. 4(b). The first discharge and charge capacities were 2018 $mAg^{-1}$ and 1539 $mAg^{-1}$ with an initial Coulombic efficiency of 67%, which corresponded to an irreversible capacity loss of 33%. In the subsequent scan, the Coulombic efficiency reached 99% and remained relatively stable. A gradual increase for both discharge and charge capacity was observed in the initial 10 cycles due to activation of more active materials to react with lithium in each cycle. The capacity remained nearly constant with little loss for subsequent cycles over 30 cycles. The excellent electrochemical performance of hybrid silicon/CNTs nanostructures as lithium-ion battery anode was attributed to its unique structure to prevent the agglomeration of silicon nano-particles, the facile strain relaxation through the CNTs and the formation of the interfacial bonding between CNTs and silicon so that the superior electrical and mechanical properties of CNTs can facilitate the kinetic transportation and render mechanical strength to the material.

The irreversible capacity usually originates from the formation of solid electrolyte interface (SEI) layers due to the redox reaction of $Li^+$ with the electrolyte solvent molecules. The SEI formation was correlated with the surface area in the carbon anode and it is believed that the same mechanism would apply to the CNTs in the present case. The specific surface area of the CNTs was much larger than that of graphite, and consequently was expected to contribute to a larger irreversible capacity. Nevertheless, due to much of the surface area of CNTS being covered by silicon nanoclusters, the irreversible loss observed was much less than that observed when CNTs were physically mixed with silicon and graphite powder without any interfacial layer forming between CNTs and silicon particles. Another potential contribution to the irreversible loss was the formation of $SiO_x$ on the surface of the silicon nanoclusters.

The plot of differential capacity with cell potential for the hybrid silicon/CNTs nanostructures is shown in FIG. 4(c) and(d). Upon examination of the first discharge, a sharp peak was observed at 0.05 V, which was due to the phase transition of amorphous $Li_xSi$ to crystalline $Li_{15}Si_4$. Two peaks at 0.23 V and 0.08 V appeared at the subsequent cycle of $2^{nd}$, $10^{th}$ and $30^{th}$ indicating the phase transition between amorphous $Li_xSi$. During charges, the peaks at 0.3 V and 0.5 V were also caused by the phase transitions between amorphous $Li_xSi$ phases. In FIG. 4(d), the magnitude of the $10^{th}$ cycle is the highest which was due to the progressive activation of silicon.

In summary, a unique hybrid silicon/CNTs 1D nanostructure involving silicon nanoclusters deposited on the surface of the CNTs through the formation of interfacial bonding was synthesized through a simple CVD process. CNTs functioned as a flexible mechanical support for strain release and an efficient conducing channel while nanoclustered silicon provided high capacity. It was demonstrated that hybrid silicon/CNTs have high reversible capacity of about 1800 $mAhg^{-1}$ with very little fading over 30 cycles.

Example 1(a)

Growth of CNTs on Bare Quartz Microscopy Slide

A two-stage CVD reactor comprising liquid and gas injectors was employed for preparing MWNTs on bare quartz microscopy slides inside a quartz tube. About 6.5 mol % of ferrocene was dissolved in xylene to obtain a feed solution with about 0.75 at. % Fe/C ratio, and was injected continuously into the two-stage tubular quartz reactor including a pre-heater maintained at a temperature of 200° C. and a reactor maintained at a temperature of 750° C. Ferrocene sublimes at about 190° C. and xylene has a boiling temperature of about 140° C. The liquid exiting the capillary tube was immediately volatilized and swept into the reaction chamber by a flow of from about 200 to about 1000 sccm of a mixture of ultra-high purity argon (UHP-Ar) with 10% pure hydrogen. After the reaction, the pre-heater and the furnace were allowed to cool down in flowing argon.

Deposition of Silicon on Pre-Grown Carbon Nanotubes

Silicon deposition was performed in the same CVD furnace where the pre-grown CNTs with quartz slide was loaded at the center of a hot zone. The reactor was pumped down to vacuum, purged with UHP-Ar gas, and then heated to desired temperatures. The deposition is carried out for different periods of time at temperatures ranging from 450° C. to 750° C. with a mixed flow of 20 sccm SiH4 and a protective argon gas. The mass of the CNTs and silicon was accurately determined by measuring the mass of the substrate each time before and after the CNTs growth and silicon deposition using an analytical balance (Mettler Toledo AB135, 0.01 mg). The as-synthesized silicon/CNTs are then scraped off from the quartz substrate for characterization and electrochemical test.

Materials Characterization

The silicon/CNTs nanomaterial powders were characterized by X-ray diffraction (XRD) using Philips XPERT PRO system with CuKα (λ=0.15406 nm) radiation in order to identify the phases present. Scanning electron microscopy (SEM) (Philips XL30 operating at 20 kV) was employed to investigate the microstructure of the as-synthesized. Transmission electron microscopy (TEM) and high-resolution TEM (HRTEM) were performed on Joel 2000EX and the FEI Tecnai F20 field emission transmission electron microscope equipped with an electron energy-loss spectroscopy (EELS) system to observe the morphology, structure and particle size of the as-prepared nanomaterials. For TEM analysis, the silicon/CNTs nanomaterial powders were dispersed on 3.05 mm diameter copper grids (electron microscopy science) containing a holey carbon film in methanol by sonication followed by drying in a desiccator overnight. Thermogravimetric analyses (TGA) of pristine CNTs was conducted using NETZSCH STA 409PC LUXX thermal analysis instrument. The heating rate was set at 10 K/min, which was conducted in dry air gas flow.

Electrochemical Test

The hybrid silicon/CNTs nanomaterials electrodes were fabricated on a copper substrate of approximately 10 mm diameter in order to evaluate the electrochemical characteristics primarily involving constant current cycling tests. About 50 wt. % of the active powder, about 10 wt. % acetylene carbon black and about 40 wt. % of sodium carbonxymethyl cellulose (CMC) binder were dissolved in deionized-water and were mixed to produce a slurry. The slurry was then coated onto a copper foil and dried over night at 383 K in a vacuum oven prior to assembling the customized test cell. A 2016 coin cell design was utilized for the electrochemical tests employing a lithium foil as the counter electrode and 1 M $LiPF_6$ in ethylene carbonate (EC)/dimethyl carbonate (DMC) (2:1) as the electrolyte. All the batteries tested in this study were cycled from 0.02 to 1.2 V employing a constant current density of 100 $mAg^{-1}$ and a minute rest period between the charge/discharge cycles using a potentiostat (Arbin electrochemical instrument).

Figure 6:
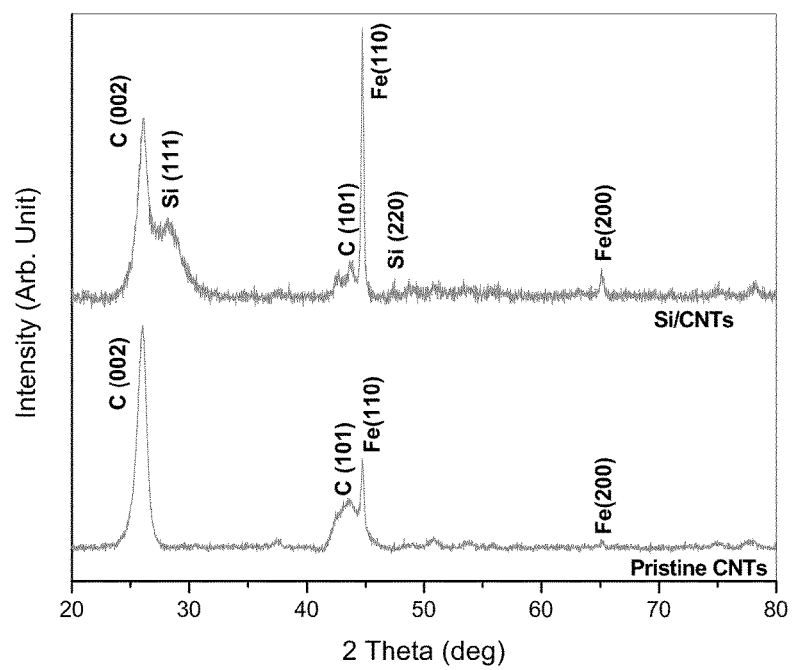
FIG. 6 is an X-ray diffraction pattern showing pristine CNTs and hybrid silicon/CNTs nanostructures.

X-ray diffraction (XRD) patterns of pristine CNTs and hybrid silicon/CNTs nanostructures are shown in FIG. 6. The presence of the nanocrystalline silicon characteristic peaks corresponding to the (111), (220) diffraction planes were observed. A peak at 26.4° C. attributed to the (002) plane of hexagonal graphite structure indicated the presence of CNTs. The existence of iron which was used to catalyze and seed the growth of CNTs from the decomposition of ferrocene was also confirmed by the Fe peak of (110) and (200), which was encapsulated inside the core channel of carbon nanotubes. The amount of iron present in the CNTs was determined to be about 5.5% in weight by thermogravimetric analysis (TGA).

FIG. 7(*a*) shows the voltage profiles generated by the hybrid silicon/CNTs nanostructures anode after 1, 10, and 30 cycles. From the voltage profile was shown that the electrochemical lithiation and de-lithiation of the nanocrystalline silicon particles attached to the CNTs surface resulted in a long, flat plateau during the first discharge. The onset of the silicon lithiation potential plateau at about 120 mV is indicative of the presence of crystalline silicon. There is no well-defined redox potential for lithium insertion/extraction with the CNTs. In FIG. 7(*a*), there is also no other potential plateau resolved other than the one corresponding to silicon.

The variation of specific gravimetric capacity with cycle number of the hybrid silicon/CNTs nanostructures anode is shown in FIG. 7(*b*). The first discharge and charge capacities were 2552 $mAg^{-1}$ and 2049 $mAg^{-1}$ respectively (all of the capacity values are calculated on the basis of silicon+CNTs mass), with an initial Coulombic efficiency of 80.3%, corresponding to an irreversible capacity loss of 19.7%. In the subsequent cycle, the Coulombic efficiency reached 99% and remained relatively stable. An increase in both discharge and charge capacity was observed from the second cycle onwards due to the activation of more silicon atoms actively reacting with lithium. The composite anode remained stable during subsequent cycling exhibiting a fade rate of about 0.15%/cycle for the subsequent twenty-five cycles. Cycling data of the Si/CNTs nanostructures anode up to 100 cycles indicated a rapid fade in capacity from 25 to 50 cycles (about 1.3% fade per cycle between 25 and 50 cycles) when the capacity dropped to about 1250 mAh/g, which then gradually stabilized to about 1000 mAh/g (about 0.4% of fading rate from 50 to 100 cycles). The specific capacity of the Si/CNTs nanostructures anode remained about 1000 mAh/g at the end of the 100th cycle. The reasons contributing to the drop in capacity may relate to a number of factors, such as weakening of the Si-CNT interface leading to detachment of the Si droplets from the CNT, weakening of the solid electrolyte interface (SEI) layer leading to kinetic barriers for Li+ transport, or fragmentation of the Si droplets attached to the CNT following 25 cycles. The Si/CNTs hybrid anode demonstrated a capacity of about 1000 mAh/g even after 100 cycles at C/10 rate which is about four-fold higher than the practical capacity achieved with graphite. The rate capability of the hybrid silicon/CNTs nanocomposite was also analyzed. FIG. 8 shows the charge and discharge curves observed at C/10, C/4, C/2, 1.3C, and 2.5C rates, demonstrating good cyclability. Even at a current rate of 2.5C, the capacity remained about 1000 $mAhg^{-1}$, which was almost three times higher than the practical capacity obtained from graphite. This excellent electrochemical performance of hybrid silicon/CNTs nanostructures as lithium-ion battery anode was believed to be a result of its unique structure to prevent the agglomeration of silicon nanoparticles, the facile strain relaxation afforded by the CNTs, and the formation of the interfacial amorphous carbon bond layer between the CNTs and silicon ensuring good contact of the silicon to CNT. Furthermore, the superior electrical and mechanical properties of CNTs, the desired kinetic transport response of lithium ions and electrons as well as the mechanical strength of the CNT assisted in anchoring the active silicon atoms to achieve the superior performance.

The irreversible capacity usually originates from the formation of SEI layers due to the redox reaction of Li+ with the electrolyte solvent molecules. The SEI formation has been correlated with the surface area of the carbon anode and it is reasonable to believe that similar mechanisms would apply to the CNTs in the present case. The specific surface area of the pristine CNTs and the Si-CNTs composite were measured using the Brunauer-Emmett-Teller method, which is shown in FIG. 9. The initial specific surface area of the pristine MWCNTs was about 240 $m^2g^{-1}$. A significant reduction in the specific surface area was observed after the deposition of silicon. In addition, the specific surface area exhibited a linear relationship with increasing silicon content of the composite in general as shown in the insert of the FIG. 9. Thus, due to the near-complete coverage of the CNT area by silicon nanoclusters, the irreversible loss observed in this example was much lower than the irreversible losses in the range of 50% reported in experiments in which single wall CNTs (SWCNTs) of high surface area were physically mixed with silicon and graphite powder without the presence of any interfacial layer between the CNTs and the silicon particles. The high surface area CNTs exposed to the Li+ in the electrolyte resulted in first cycle irreversible losses of about 50%. Another potential contribution to the irreversible loss was the formation of $SiO_x$ on the surface of the silicon nanoclusters. However, the reduction plateau of SiO was not observed in the voltage profile.

The plot of differential capacity with cell potential for the hybrid silicon/CNTs nanostructures is shown in FIGS. 7(c) and (d). Upon examination of the first discharge, a main peak was observed at 0.060 V with an onset potential of about 0.12V during the first discharge corresponding to the long flat plateau in the first discharge voltage profile. The differential capacity plot of the 1st charge (FIG. 7(c)) shows not only a broad hump at about 0.45V, but also an additional broad peak with a peak potential at about 0.3V. The two broad peaks that were observed in the 1st charge suggested the possibility of the presence of amorphous silicon.

The differential capacity plots of the 2nd and subsequent 10th and 25th cycle discharge and charge reactions of the hybrid Si/CNTs nanocomposite anode are shown in FIGS. 7(c) and (d). Two peaks at about 0.23V and about 0.08V appear during discharge in the subsequent 2nd, 10th, and 25th cycles which suggested the process of dealloying from the P-I phase to form the P-II phase and the subsequent transition from the P-II phase to form the P-III phase. In addition, similar to the 1st discharge reaction, a peak at potential about 0.045V was also observed during the 2nd discharge due to the lithiation of crystalline silicon to form amorphous silicon which suggested a presence of crystalline and amorphous silicon. In FIG. 7(d), the magnitude of the peaks in the 10th cycle was the highest, which may be due to the progressive activation of silicon.

Example 2

Growth of Multi-Walled Nanotubes on Inconel Alloy Disk

A chemical vapor deposition ("CVD") reactor including a stainless steel bottle as pre-heater was employed for preparing multi-walled nanotubes ("MWNTs") on an Inconel alloy disk of 1 $cm^2$ inside a quartz tube. Approximately 0.1 g of ferrocene was dissolved in 10 ml of xylene to obtain a feed solution, and was injected continuously into the stainless steel bottle at an injection rate of 0.11 ml/min. The stainless steel bottle was maintained at 200° C. for pre-heating, and the reactor was at 770° C. for MWNTs growth. Ferrocene sublimes at about 190° C. and xylene has a boiling temperature of about 140° C. The solution injected into the stainless steel bottle was immediately volatilized and swept into the reaction chamber by a flow of 100 sccm mixture of ultra-high purity argon ("UHP-Ar") with 10% pure hydrogen. After the reaction, the pre-heater and the furnace were allowed to cool down in flowing argon.

Silicon deposition was performed in the same CVD furnace, where the Inconel disk with pre-grown CNTs was loaded at the center of hot zone. The reactor was pumped to vacuum, purged with UHP-Ar gas then heated to desired temperatures. The deposition was carried out for different periods of time at a temperature of about 500° C. with a mixed flow of 20 sccm $SiH_4$ and 680 sccm of argon. The mass of the CNTs and silicon was determined by measuring the mass of the substrate each time before and after the CNTs growth and silicon deposition using an analytical balance (Mettler Toledo AB135, 0.01 mg). The as-synthesized silicon/MWNTs hierarchical electrodes were directly assembled into a prototype coin cell for characterization and electrochemical test.

Scanning electron microscopy ("SEM") (Philips XL30 operating at 20 kV) was employed to investigate the morphology and microstructure of the as-synthesized MWNTs on Inconel disk and silicon/MWNTs hierarchical electrodes. The silicon/MWNTs nanomaterial powders were scraped off from the Inconel disk and characterized by transmission electron microscopy ("TEM") and high-resolution TEM ("HRTEM") on Joel 2000EX to observe the morphology, structure and particle size of the as-prepared nanomaterials. For TEM analysis, the silicon/MWNTs nanomaterial powders were dispersed on 3.05 mm diameter copper grids (electron microscopy science) containing a holey carbon film in methanol by sonication followed by drying in a desiccator over night.

Without any post-synthesis treatment, the as-synthesized silicon/MWNTs hierarchical electrodes were directly assembled into a prototype coin cell for characterization and electrochemical test primarily involving constant current cycling tests. A 2016 coin cell design was utilized for the electrochemical tests employing a lithium foil as the counter electrode and 1 M $LiPF_6$ in ethylene carbonate (EC/dimethyl carbonate ("DMC") (2:1) as the electrolyte. All the batteries tested in this study were cycled from 0.02 to 1.2 V employing a constant current density of 100 $\mu Ag^{-1}$ and a minute rest period between the charge/discharge cycles using a potentiostat (Arbin electrochemical instrument).

Results

A two-step chemical vapor deposition ("CVD") was employed to prepare the silicon/CNTs through a template free approach. The MWNTs were first synthesized on Inconel 600 alloy disk of 1 $cm^2$ (from Goodfellow) through a CVD reactor, in which xylene ($C_8H_{10}$) served as hydrocarbon source and iron from decomposition of ferrocene (Fe($C_5H_5$)$_2$) catalyzed the growth of the MWNTs. The system wais subsequently pumped down to deposit silicon onto MWNTs by a flow of $SiH_4$ gas. A coin cell prototype battery was directly prepared using the as-synthesized silicon/CNTs nano-architectured electrode for electrochemical evaluation. The Si/C ratio is controlled by the duration of reactions for MWNTs growth and silicon deposition respectively, which enable us to tune the electrochemical properties of the hybrid silicon/carbon nanotubes.

Figures 5A, 5B:
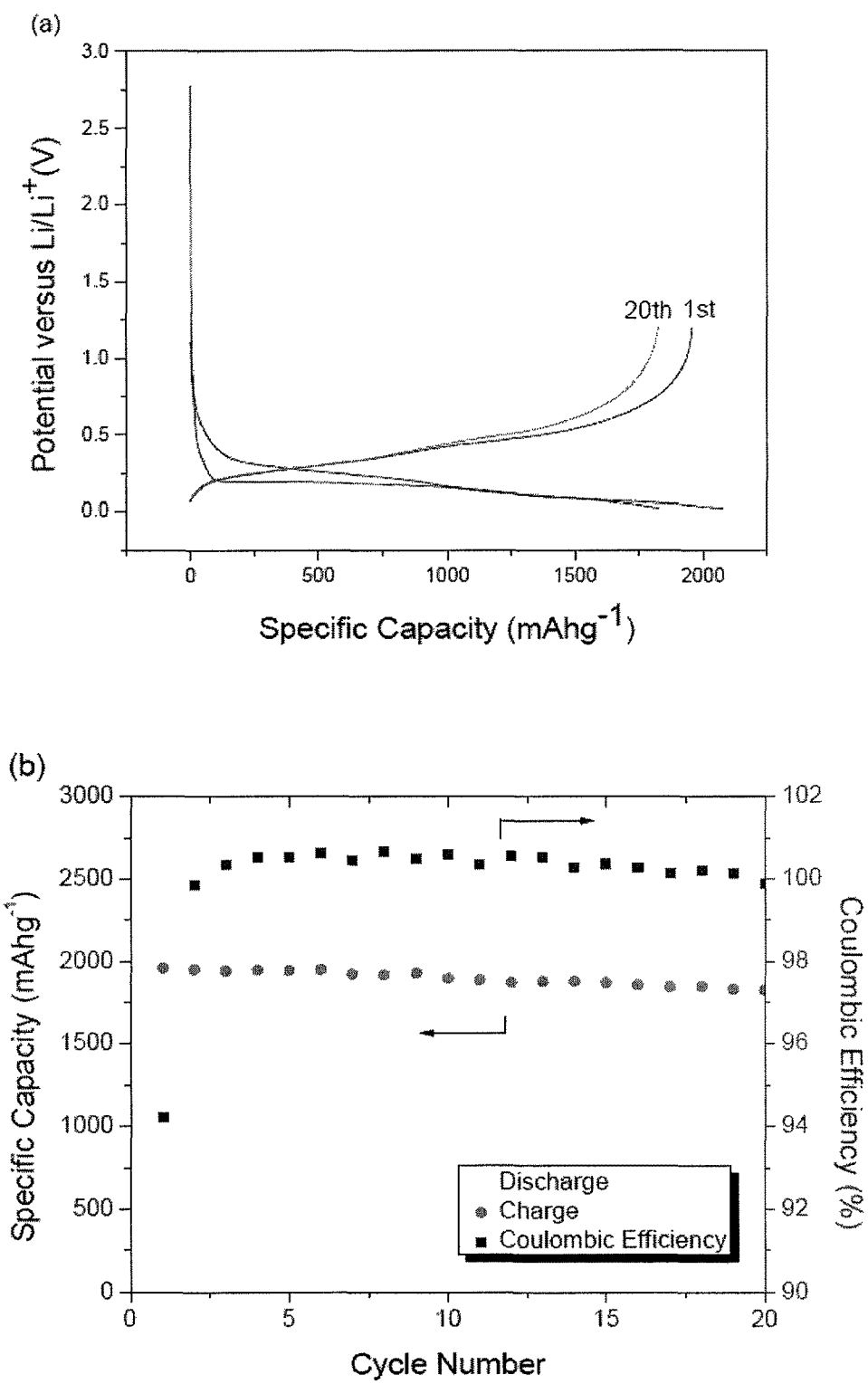
FIG. 5(a) is a plot showing voltage profiles for a hybrid silicon/CNT nanostructure on an Inconel 600 alloy disk after 1 cycle, 10 cycles and 30 cycles.
FIG. 5(b) is a plot showing a curve of discharge/charge capacity and Coulombic efficiency of the cell over 30 cycles for a hybrid silicon/CNT nanostructure on an Inconel 600 alloy disk.

FIG. 5(a) shows voltage profiles of the hierarchical silicon/CNTs nano-architectured anode after 1 cycle and 20 cycles. From the voltage profile, it is demonstrated that the electrochemical lithiation and de-lithiation of the nanocrystalline silicon particles attached to the CNTs surface results in a long flat plateau during the first discharge. The onset of the silicon lithiation potential plateau is about 190 mV indicating the presence of crystalline silicon. In FIG. 5(a), there is no other potential plateau resolved other than the one that represents the silicon.

The variation of specific gravimetric capacity with cycle number of the hierarchical silicon/CNTs nano-architectured anode is shown in FIG. 5(b). The first discharge and charge capacities were 2078 mAg$^{-1}$ and 1958 mAg$^{-1}$ with an initial Coulombic efficiency of 94%, which corresponded to an irreversible capacity loss of 6%. In the subsequent scan, the Coulombic efficiency reached >99.5% and remained relatively stable. The capacity remained fairly constant with little loss for subsequent cycles over 20 cycles with a loss per cycle of about 0.3%. The excellent electrochemical performance of the hierarchical silicon/CNTs nano-architectured anode was attributed to its unique structure to provide the facile strain relaxation through the CNTs and the strong adhesion between CNTs and silicon so that the superior electrical and mechanical properties of CNTs could be capitalized on to facilitate the kinetic transportation and to render the mechanical strength to the material. The hierarchical silicon/CNTs nano-architectured anode deliver a good capacity and cyclability but with a remarkably low irreversible loss, which was owed to the unique design of the hierarchial electrode with a facile transportation property and reduced number of extra interfaces.

Figure 5C:
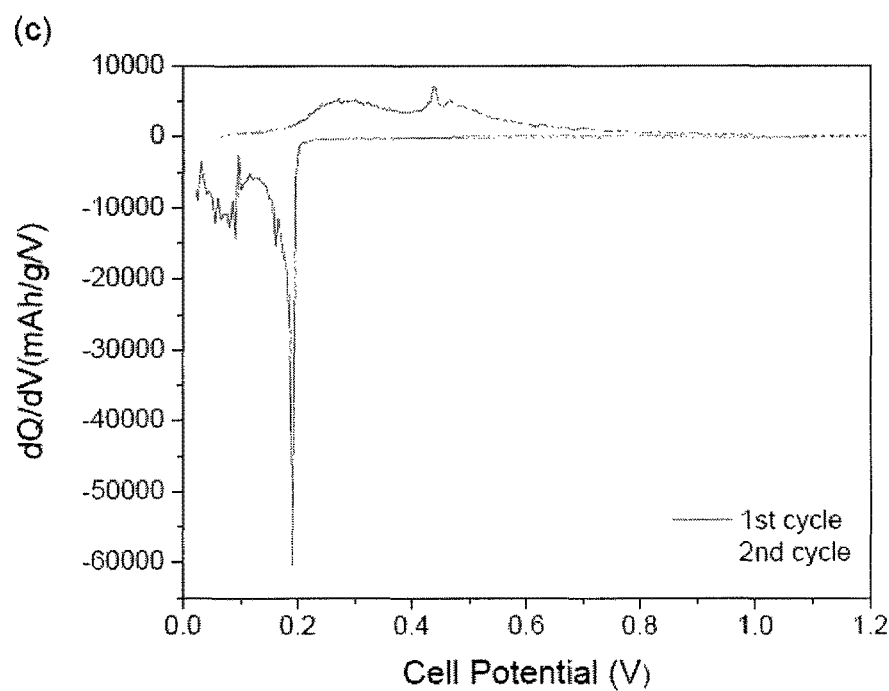
FIG. 5(c) is a plot showing differential capacity with cell potential of hybrid silicon/CNT nanostructure anodes after first and second cycles for a hybrid silicon/CNT nanostructure on an Inconel 600 alloy disk.
Figure 5D:
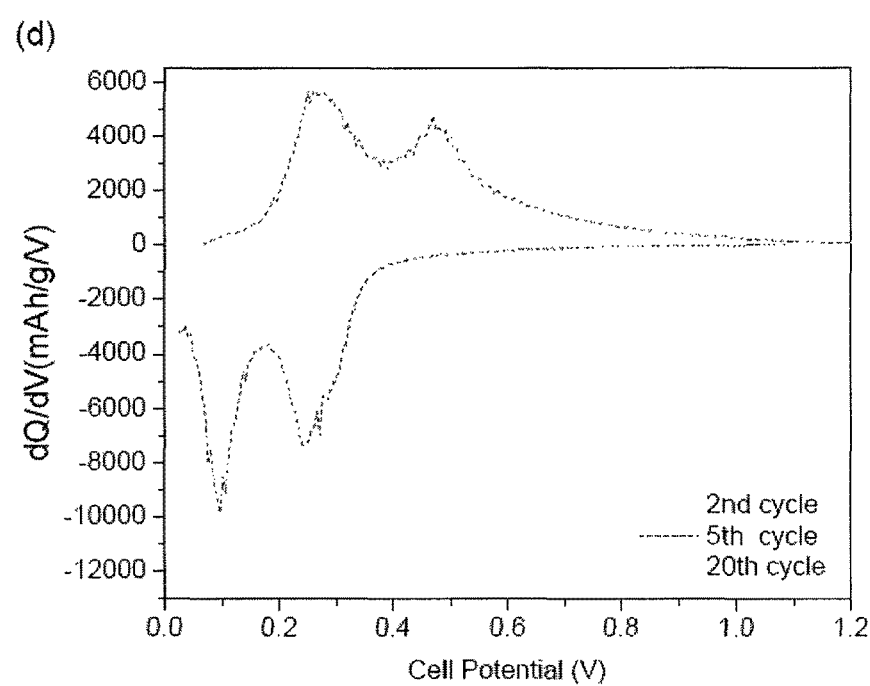
FIG. 5(d) is a plot showing differential capacity with cell potential of hybrid silicon/CNT nanostructure anodes after second, tenth and thirtieth cycles for a hybrid silicon/CNT nanostructure on an Inconel 600 alloy disk.

The plot of differential capacity with cell potential for the hybrid silicon/CNTs nanostructures is shown in FIGS. 5(c) and 5(d). Upon examination of the first discharge, sharp peaks were observed at about 0.08V and 0.19V, which was due to the formation of amorphous Li$_x$Si. A peak at 0.23 V appeared during discharge in the subsequent $2^{nd}$, $5^{th}$ and $20^{th}$ cycles which suggested that the crystalline silicon transformed to amorphous silicon after the first cycle.

In summary, a hierarchical silicon/CNTs nano-architectured anode was synthesized through a simple two-step CVD process, which eliminated the involvement of polymer binder and the conventional electrode preparation process. The direct synthesis of active silicon/carbon nanotubes hybrid nanocomposite onto the current collector ensured that every individual Si/CNT was electrically end-connected in situ, and therefore, maximized the benefit of the facile transportation property of carbon nanotubes. CNTs also functioned as a flexible mechanical support for strain release while nanoclustered silicon provide high capacity. The successful synthesis of hierarchical silicon/CNTs nano-architectured electrode provided a generic template-free approach to fabricate the electrode with tailored material composition and functionality, which could be seamlessly integrated into an energy storage device for different applications.

Whereas particular embodiments of the invention have been described herein for purposes of illustration, it will be evident to those skilled in the art that numerous variations of the details may be made without departing from the invention as set forth in the appended claims.

What is claimed is:

1. A lithium-ion battery anode electrode, comprising:
a current collector having a planar surface;
a plurality of a first nanomaterial selected from the group consisting of carbon nanotube, carbon nanowire, carbon nanorod and mixtures thereof, having a first end and a second end, the first end deposited on the planar surface of the current collector, each of said plurality of the first nanomaterial being vertically aligned with one another, perpendicular to the planar surface of the current collector, and exhibiting defined spacing between one another;
a plurality of a second nanomaterial deposited on a surface of each of the plurality of the first nanomaterial, the second nanomaterial composed of an element selected from the group consisting of metallic, metalloid, non-metallic and mixtures thereof, the second nanomaterial as-deposited in a form selected from the group consisting of nano-particle, nano-cluster, droplet and mixtures thereof, each of the plurality of the second nanomaterial exhibiting defined spacing between one another,
wherein the surface of the plurality of a first nanomaterial underlying the plurality of a second nanomaterial has excess amorphous carbon; and
an interfacial layer comprising the amorphous carbon, formed in-situ on the plurality of a first nanomaterial underlying said plurality of a second nanomaterial.

2. The lithium-ion battery anode electrode of claim 1, wherein the first nanomaterial is nanotubes that comprise B, C$_3$N$_4$, BN, TiN, TiC, SiC, Si$_3$N$_4$, WN, MoN, Mo$_2$N, VN, CrN, B$_4$C, BC$_3$, TiB$_2$, Mo$_2$B, WC, MoC, VC, non-oxides of transition metals, transition metal silicides and mixtures thereof.

3. The composition of claim 1, wherein the nanowires and nanorods comprise oxide nanowires and nanorods of transition metals and semiconductors of Group IV, Group IIIA, Group IIIB, and Group II elements, and mixtures thereof.

4. The composition of claim 3, wherein the nanowires and nanorods comprise ZnO, SnO$_2$, In$_2$O$_3$, CdO, SiO$_2$, CuO, Ti, Cr, Fe, Ni, Mn, Co, Cu, Zn, GaN, BN, Si$_3$N$_4$, TiN, TiC, TiB$_2$, GaAs, GaP, InP, AIP, transition metal silicides and mixtures thereof.

5. The lithium-ion battery anode electrode of claim 1, wherein the second nanomaterial is nano-particles that comprise Al, Si, Sn, Sb, Ge, Pb, Bi, Mg, Zn, Cd, In, Ca, As, Pt, Ag, Au, Hg, Cr, Ga and mixtures thereof.

6. The lithium-ion battery anode electrode of claim 1, wherein the first nanomaterial is carbon nanotubes.

7. The lithium-ion battery anode electrode of claim 1, wherein the second nanomaterial is silicon-containing nano-particles.

8. The composition of claim 1, wherein the nano-particles are doped.

9. The lithium-ion battery anode electrode of claim 1, wherein the first nanomaterial is doped.

10. A lithium-ion battery anode electrode, comprising:
a current collector having a planar surface;
a plurality of carbon nanotubes, each having a first end and a second end, the first end deposited on the planar surface of the current collector, each being vertically aligned with one another and perpendicular to the planar surface of the current collector, and each of the plurality of carbon nanotubes having defined spacing there between;
a plurality of silicon droplets deposited on a surface of each of the plurality of carbon nanotubes, and each of the plurality of silicon droplets having defined spacing there between,
wherein the surface of the plurality of carbon nanotubes underlying the silicon droplets has excess amorphous carbon; and
an interfacial layer comprising the amorphous carbon formed in-situ on the surface of the plurality of carbon nanotubes, underlying the plurality of the silicon droplets.

11. A lithium-ion battery anode electrode, comprising:
a current collector having a planar surface;
a first nanomaterial selected from the group consisting of carbon nanotube, carbon nanowire, carbon nanorod and mixtures thereof, having a first end and a second end, the first end deposited on the planar surface of the current collector, each of said plurality of the first nanomaterial being vertically aligned with one another, perpendicular to the planar surface of the current collector, and having defined spacing there between;
a second nanomaterial deposited on a surface of the first nanomaterial in a non-continuous form selected from the group consisting of nano-particle, nano-cluster, droplet and mixtures thereof, the second nanomaterial composed of an element selected from the group consisting of metallic, metalloid, non-metallic and mixtures thereof, the non-continuous form of the second nanomaterial having defined spacing there between; and
an interfacial layer formed in-situ comprising amorphous carbon present on the surface of the first nanomaterial underlying the second nanomaterial.

\* \* \* \* \*

UNITED STATES PATENT AND TRADEMARK OFFICE
CERTIFICATE OF CORRECTION

PATENT NO.         : 10,366,802 B2
APPLICATION NO.    : 12/794374
DATED              : July 30, 2019
INVENTOR(S)        : Prashant Nagesh Kumta et al.

Page 1 of 1

It is certified that error appears in the above-identified patent and that said Letters Patent is hereby corrected as shown below:

In the Specification

Column 1, Lines 16-22:
"GOVERNMENT CONTRACT
This work was supported in part by a grant from the United States Department of Energy Batteries for Advanced Transportation Technology (BATT) Program; Grant Number 6826681."
Should read:
--GOVERNMENT SUPPORT
This invention was made with government support under grant number DE-AC6826681 awarded by the Department of Energy (DOE). The government has certain rights in the invention.--

Signed and Sealed this
Third Day of September, 2019

Andrei Iancu
*Director of the United States Patent and Trademark Office*